United States Patent
Kim (10) Patent No.: US 8,999,557 B2
(45) Date of Patent: Apr. 7, 2015

(54) BATTERY PACK WITH ELASTIC FRAME

(75) Inventor: Tae-Yong Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 708 days.

(21) Appl. No.: 12/805,164

(22) Filed: Jul. 15, 2010

(65) Prior Publication Data

US 2011/0262799 A1    Oct. 27, 2011

Related U.S. Application Data

(60) Provisional application No. 61/282,912, filed on Apr. 21, 2010.

(51) Int. Cl.
| | | |
|---|---|---|
| *H01M 10/02* | (2006.01) | |
| *H01M 2/10* | (2006.01) | |
| *H01M 10/42* | (2006.01) | |
| *H01M 10/04* | (2006.01) | |
| *H01M 10/625* | (2014.01) | |
| *H01M 10/62* | (2014.01) | |
| *H01M 10/052* | (2010.01) | |

(52) U.S. Cl.
CPC ........ *H01M 2/1077* (2013.01); *H01M 10/4207* (2013.01); *H01M 2/1005* (2013.01); *H01M 10/0486* (2013.01); *H01M 10/5016* (2013.01); *H01M 10/0481* (2013.01); *H01M 2/1016* (2013.01); *H01M 2/1094* (2013.01); *H01M 10/501* (2013.01); *H01M 10/052* (2013.01); *Y02T 10/7011* (2013.01)

(58) Field of Classification Search
CPC . H01M 10/02; H01M 10/04; H01M 10/0481; H01M 10/0486; H01M 10/501; H01M 10/5016; H01M 2/10; H01M 2/1005; H01M 2/1016; H01M 2/1077; H01M 2/1094
USPC .................................................. 429/156–159
See application file for complete search history.

(56) References Cited

U.S. PATENT DOCUMENTS

| | | | | |
|---|---|---|---|---|
| 3,679,188 | A * | 7/1972 | Trindle | 267/52 |
| 4,008,356 | A * | 2/1977 | Asano | 429/98 |
| 6,326,103 | B1 * | 12/2001 | Ido et al. | 429/156 |
| 2003/0017384 | A1 * | 1/2003 | Marukawa et al. | 429/120 |
| 2003/0017387 | A1 * | 1/2003 | Marukawa et al. | 429/156 |

(Continued)

FOREIGN PATENT DOCUMENTS

| | | | | |
|---|---|---|---|---|
| JP | 2003-142052 A | | 5/2003 | |
| JP | 2003142052 | * | 5/2003 | .............. H01M 2/10 |

(Continued)

OTHER PUBLICATIONS

Machine English Translation of JP 2003142052 to Handa et al.*

(Continued)

*Primary Examiner* — Milton I Cano
*Assistant Examiner* — Michael Dignan
(74) *Attorney, Agent, or Firm* — Lee & Morse, P.C.

(57) ABSTRACT

A battery module including a plurality of unit battery cells stacked in a first direction; a pair of end plates spaced from each other in the first direction and accommodating the unit battery cells therebetween; an elastic frame below the unit battery cells, the elastic frame extending in the first direction and the elastic frame having the capability of being elastically biased in a second direction.

16 Claims, 11 Drawing Sheets

(56) References Cited

U.S. PATENT DOCUMENTS

2003/0162091 A1\* 8/2003 Watanabe et al. ............. 429/156
2005/0250005 A1\* 11/2005 Bacon et al. .................. 429/152
2006/0286441 A1\* 12/2006 Matsuoka et al. ............. 429/99
2011/0024207 A1 2/2011 Higashino et al.

FOREIGN PATENT DOCUMENTS

| JP | 2005-116457 A | | 4/2005 | |
| --- | --- | --- | --- | --- |
| JP | 2005116457 | \* | 4/2005 | ............. H01M 2/10 |
| JP | 2006-140022 A | | 6/2006 | |
| JP | 2007-299544 A | | 11/2007 | |
| JP | 2009-277646 A | | 11/2009 | |
| JP | 2009277646 A | \* | 11/2009 | |
| JP | 2009-283193 A | | 12/2009 | |
| JP | 2009-301835 A | | 12/2009 | |
| JP | 2009301835 A | \* | 12/2009 | |
| JP | 2010-092833 A | | 4/2010 | |
| JP | 2011-210451 A | | 10/2011 | |

OTHER PUBLICATIONS

Machine English Translation of JP 2005116457 to Shimizu et al.\*
European Search Report issued in corresponding European application, 11 16 0765, dated Jul. 4, 2011.
Office Action issued in corresponding Korean application, 10-2010-0076964, dated Sep. 19, 2011.
Japanese Office Action in JP 2011-050430, dated Mar. 26, 2013 (Kim).
European Office Action dated Apr. 16, 2014.
Chinese Office Action dated Jun. 24, 2014.

\* cited by examiner

BATTERY PACK WITH ELASTIC FRAME

The present application claims priority under 35 U.S.C. §119(e) to U.S. Provisional Application No. 61/282,912, filed on Apr. 21, 2010, and entitled: "Battery Pack," which is incorporated herein by reference in its entirety.

BACKGROUND

1. Field

Embodiments relate to a battery pack.

2. Description of the Related Art

Secondary batteries are rechargeable batteries, as opposed to primary batteries that cannot be recharged. Secondary batteries are broadly used in high-tech electronic devices, e.g., cellular phones, notebook computers, and camcorders, and also are used in vehicles.

A secondary battery may include an electrode assembly and an electrolyte. The electrode assembly may include a positive plate, a negative plate, and a separator. The electrolyte may include lithium ions. The positive and negative plates of the electrode assembly may each include an electrode tab protruding outward.

The electrode assembly may be accommodated in a case and electrode terminals may be exposed outside the case. The electrode tabs may protrude outside the electrode assembly so as to be electrically connected to the electrode terminals. The case may have, e.g., a cylindrical shape or a rectangular parallelepiped shape.

A plurality of unit battery cells, e.g., secondary batteries, may be horizontally or vertically stacked so as to form a battery module. Also, a plurality of battery modules may be vertically and/or horizontally stacked so as to form one battery pack.

SUMMARY

Embodiments are directed to a battery pack, which represents advances over the related art.

It is a feature of an embodiment to provide a battery pack capable of reducing sagging of battery modules each formed by stacking a plurality of unit battery cells.

At least one of the above and other features and advantages may be realized by providing a battery module including a plurality of unit battery cells stacked in a first direction; a pair of end plates spaced from each other in the first direction and accommodating the unit battery cells therebetween; an elastic frame below the unit battery cells, the elastic frame extending in the first direction and the elastic frame having the capability of being elastically biased in a second direction.

The elastic frame may have a plate spring structure.

The battery module may further include support protrusions between the battery cells and ends of the elastic frame.

The elastic frame may be coupled to the end plates with the support protrusions.

The battery module may further include a lower frame below the battery cells.

The elastic frame may be coupled to the lower frame with the support protrusions.

The battery module may further include an upper frame coupled to upper surfaces of the pair of end plates; and side supports coupled to side surfaces of the pair of end plates.

The battery module may further include a spacer on the support protrusions, the spacer being between the battery cells and ends of the elastic frame.

The elastic frame may have support openings, and the support protrusions may be coupled to the support openings of the elastic frame.

The support protrusions may be fixed protrusions extending from one of the end plates or the lower frame.

The elastic frame may have an elastic portion and the elastic portion may be narrower than the support portions.

The elastic frame may have an elastic portion and the elastic portion may be wider than the support portions.

The elastic frame may include an elastic portion, support portions, and support openings on the support portions.

The support openings may be open ended support grooves.

The support openings may be support through holes.

The support protrusions may be disposed at ends of the lower frame, the support openings may be disposed at ends of the elastic frame, and the support protrusions may be coupled to the support openings.

The elastic frame may be configured to be bent into a biased condition only after assembly of the battery module.

The elastic frame may have a bent configuration for effecting a spring bias prior to assembly of the battery module.

At least one of the above and other features and advantages may also be realized by providing a battery module including a plurality of unit battery cells stacked in a first direction; a pair of end plates spaced from each other in the first direction and accommodating the unit battery cells therebetween; a support frame below the unit battery cells, the support frame extending in the first direction in an arc shape arched toward the battery cells.

At least one of the above and other features and advantages may also be realized by providing a battery module including a plurality of unit battery cells stacked in a first direction; a pair of end plates spaced from each other in the first direction and accommodating the unit battery cells therebetween; a support frame below the unit battery cells for supporting the unit battery cells, the support frame extending in the first direction, the support frame also having end regions, each end region being adjacent to one of the end plates, and a middle region between the end regions, the middle region extending in a second direction toward the unit battery cells so as to be disposed upwardly and inwardly relative to the end regions.

BRIEF DESCRIPTION OF THE DRAWINGS

The above and other features and advantages will become more apparent to those of ordinary skill in the art by describing in detail exemplary embodiments with reference to the attached drawings, in which:

FIG. 5(c) illustrates an elastic frame not yet assembled, FIG. 5(b) illustrates an elastic frame assembled to a lower frame not yet having battery cells thereon.

FIG. 5A(b) illustrates an elastic frame according to another embodiment not yet assembled, FIG. 5A(a) illustrates a cross-section of a battery module having the battery cells mounted on a lower frame to which the elastic frame has been coupled;

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

A battery pack 10 according to an embodiment may be formed by stacking at least one battery module 100 vertically and/or horizontally. Each of the battery modules 100 may be formed by stacking at least one unit battery cell 110 vertically and/or horizontally.

For example, the battery pack 10 may be formed by stacking a plurality of battery modules 100 vertically. Each of the battery modules 100 may sag under the load of a plurality of unit battery cells 110. Due to the sagging of the battery modules 100, undesirable vibration may occur.

In each of the battery modules 100, an elastic frame 160 may support the stacked unit battery cells 110 from below. In this case, the elastic frame 160 may support the load of the stacked unit battery cells 110 so as to be elastically biased from below to above.

To this end, the elastic frame 160 may be previously bent upward and then disposed below the stacked unit battery cells 110. Consequently, the elastic frame 160 may be assembled while being maintained level or slightly bent upward by the load of the stacked unit battery cells 110.

Accordingly, the elastic frame 160 may elastically support a sagging portion of each of the battery modules 100, thereby suppressing the sagging and vibration of each of the battery modules 100.

Figure 1:
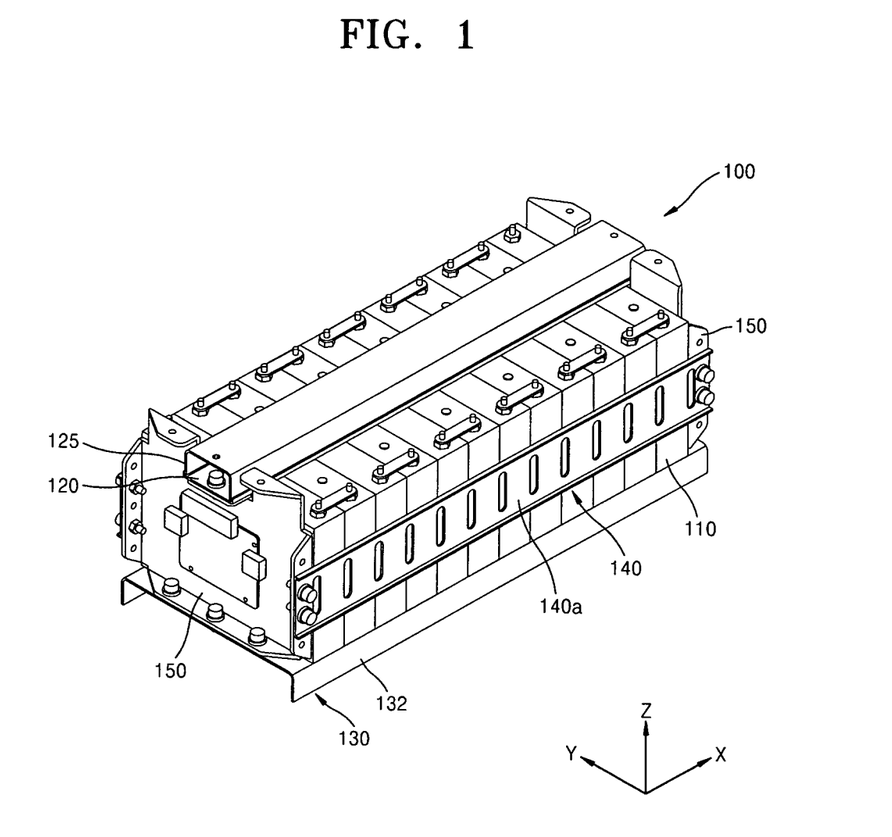
FIG. 1 illustrates a perspective view of a battery module formed by stacking a plurality of unit battery cells included in a battery pack according to an embodiment.
Figure 2:
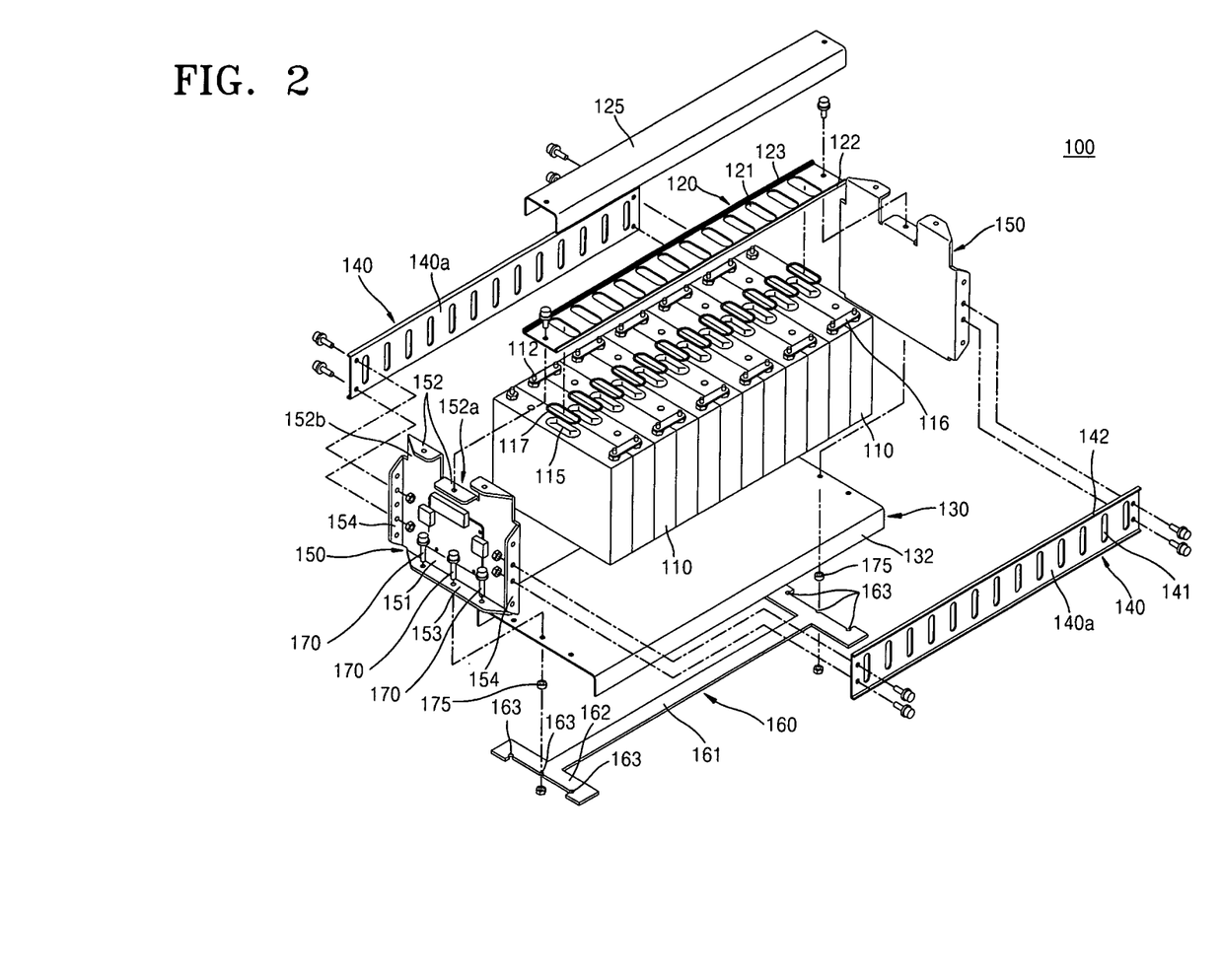
FIG. 2 illustrates an exploded perspective view of components of the battery module of FIG. 1.

FIG. 1 illustrates a perspective view of a battery module 100 formed by horizontally stacking a plurality of unit battery cells 110 and included in a battery pack according to an embodiment. FIG. 2 illustrates an exploded perspective view of components of the battery module 100 of FIG. 1. The battery pack may be formed by stacking a plurality of the battery modules 100 vertically and/or horizontally.

Referring to FIGS. 1 and 2, the battery module 100 may include a plurality of unit battery cells 110, an upper frame 120, a lower frame 130, side supports 140, end plates 150, and an elastic frame 160.

The unit battery cells 110 may be stacked in a first direction to form the battery module 100. The upper frame 120 may be disposed above the unit battery cells 110 stacked in the first direction so as to support the unit battery cells 110 in a second direction. The lower frame 130 may be disposed below the unit battery cells 110 stacked in the first direction so as to support the unit battery cells 110 from below.

The side supports 140 may be disposed on sides of the unit battery cells 110 stacked in the first direction so as to support the unit battery cells 110 from sides in a third direction. A pair of the end plates 150 may be disposed on both ends, respectively, of the unit battery cells 110 stacked in the first direction so as to support the unit battery cells 110 from the respective ends.

The elastic frame 160 may elastically support the stacked unit battery cells 110 in the second direction. In other words, the elastic frame 160 may be installed on the end plates 150 and/or the lower frame 130 so as to be elastically biased in the second direction.

Here, the first direction may be the X direction, the second direction may be the Z direction, and the third direction may be the Y direction. In this case, if the battery module 100 is horizontally disposed, the X direction may be a horizontal direction and the Z direction may be a vertical direction. However, the X and Y directions are not limited thereto and may be differently regarded according to an arrangement direction of the battery module 100.

The battery module 100 may sag due to static load including, e.g., both the weight of the stacked unit battery cells 110 and the self weight of the battery module 100. The battery module 100 may also sag or shake due to dynamic load, e.g., impacts, vibrations, or the like, applied to the battery module 100. In this case, performance of the battery module 100 may be degraded due to; e.g., the sagging, the shake, or the like, caused by the static load and/or the dynamic load.

The stacked unit battery cells 110 may be mounted on the lower frame 130. At this time, the lower frame 130 may support the stacked unit battery cells 110 from below in the Z direction. The lower frame 130 may effectively support the static load of the stacked unit battery cells 110.

The elastic frame 160 according to the present embodiment may also elastically support the stacked unit battery cells 110 from below in the Z direction. The elastic frame 160 may act as a spring and suppress the sagging of the battery module 100. Thus, the elastic frame 160 may effectively support a dynamic load generated by the stacked unit battery cells 110.

In the present embodiment, the lower frame 130 and the elastic frame 160 may be separately included in the battery module 100. However, the embodiments are not limited thereto; and the battery module 100 may include only either the lower frame 130 or the elastic frame 160. In this case, the lower frame 130 may perform the function of the elastic frame 160 as well as its own function.

Figure 3:
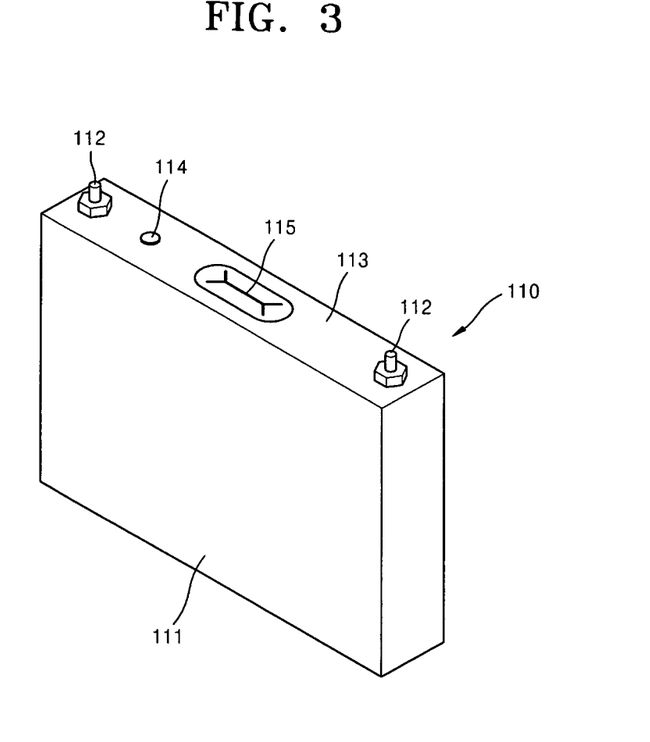
FIG. 3 illustrates a schematic perspective view of an exterior of a unit battery cell included in the battery pack of FIG. 1.

FIG. 3 illustrates an exterior of one of the unit battery cells 110 included in the battery module 100 of FIG. 1. A plurality of the unit battery cells 110 may be stacked in the horizontal direction so as to form the battery module 100 and may generally have a rectangular parallelepiped shape as illustrated in FIG. 3. However, the unit battery cells 110 are not limited to the rectangular parallelepiped shape and may also have various shapes, e.g., a cylindrical shape or a pouch shape.

The unit battery cells 110 may generally be secondary batteries. A secondary battery may include an electrode assembly and an electrolyte. The electrode assembly may include a positive plate, a negative plate, and a separator. The electrolyte may contain lithium ions. The positive and negative plates of the electrode assembly may be electrically connected to a current collector (not illustrated).

The electrode assembly may be accommodated in a case 111 and electrode terminals 112 may be exposed outside the case 111. The current collector electrically connected to the positive and negative plates may be electrically connected to the electrode terminals 112 within the case 111. The case 111 may have, e.g., a cylindrical shape or a rectangular parallelepiped shape. In an implementation, the unit battery cell 110 may include a plurality of electrode assemblies in one case 111.

A plurality of unit battery cells 110 may be horizontally stacked so as to form the battery module 100. In the battery module 100, the electrode terminals 112 of neighboring unit battery cells 110 may be electrically connected to each other. In this case, the electrode terminals 112 of the neighboring unit battery cells 110 may be electrically connected by using bus bars 116.

The neighboring unit battery cells 110 may be disposed so that polarities of neighboring electrode terminals thereof are opposite to each other. A plurality of unit battery cells 110 may be connected in parallel, in series, or both in parallel and in series. Accordingly, the unit battery cells 110 may be continuously connected to each other so as to form one battery module 100. The connection method and the number of unit battery cells 110 to be stacked may be determined in consideration of desired electric capacities when the unit battery cells 110 are designed.

A cap plate 113 may be coupled to an opening of the case 111. The cap plate 113 may be a thin plate. An electrolyte inlet for injecting the electrolyte into the case 111 may be formed in the cap plate 113. The electrolyte inlet may be sealed with a sealing plug 114 after the electrolyte is injected.

A vent member 115 in which grooves are formed may be formed on the cap plate 113 such that the vent member 115 may be broken when a predetermined internal pressure is reached. If the upper frame 120 is disposed on the unit battery cells 110 that are horizontally stacked, exhaust outlets 121 of the upper frame 120 may be disposed on vent members 115.

The unit battery cells 110 according to the present embodiment may be lithium-ion secondary batteries as described above. However, the unit battery cells 110 are not limited to the lithium-ion secondary batteries and may also be various batteries, e.g., nickel-cadmium secondary batteries, nickel-hydrogen secondary batteries, lithium batteries, or the like.

In each of the unit battery cells 110 containing lithium, the electrode assembly may expand or contract when charge or discharge occurs. In this case, the expansion and the contraction of the electrode assembly may apply physical force to the case 111. As such, the case 111 may physically expand and contract in correspondence with the expansion and the contraction of the electrode assembly.

Deformation of the case 111 may be fixed due to repeated expansion and contraction. The expansion in volume may increase resistance so as to reduce the efficiency of the unit battery cells 110. In order to prevent the reduction in efficiency, a pair of the end plates 150 may be disposed at both ends of the electrically connected unit battery cells 110 stacked in the horizontal direction and/or the vertical direction.

The upper frame 120, the lower frame 130, and the side supports 140 may be disposed on upper, lower, and side surfaces, respectively, of the end plates 150 and may compress and fix the unit battery cells 110 such that the unit battery cells 110 do not extend in the horizontal direction due to expansion and contraction.

The end plates 150 may be disposed at respective ends of the battery module 100. One surface of each of the end plates 150 may contact outer surfaces of the unit battery cells 110 disposed at both outermost sides of the battery module 100 such that the unit battery cells 110 are supported by the end plates 150.

Each of the end plates 150 may include a base plate 151 and flanges 152, 153, and 154. The base plate 151 may have a size that is sufficient to cover an outer surface of the unit battery cells 110. Although the base plate 111 has an almost square shape in the present embodiment, the shape of the base plate 111 is not limited thereto.

The flanges 152, 153, and 154 may be bent from the base plate 151 away from the unit battery cells 110. The flanges 152, 153 and 154 may include top flanges 152, a bottom flange 153, and side flanges 154. The top flanges 152 are coupled to the upper frame 120. The bottom flange 153 is coupled to the lower frame 130. The side flanges 154 are correspondingly coupled to the side supports 140.

Meanwhile, a plurality of the battery modules 100 may be vertically and/or horizontally stacked so as to form the battery pack 10. In this case, the end plates 150 of neighboring battery modules 100 may be coupled to each other so that the neighboring battery modules 100 are supported by each other.

The top flanges 152 of one battery module 100 may be coupled to the bottom frame 130 of a battery module 100 that is stacked thereabove. The bottom flanges 153 of one battery module 100 may be coupled to the lower frame 130 of the battery module 100 that exists below the bottom flanges 153.

In this case, the top, bottom, and side flanges 152, 153, and 154 may be respectively screw-coupled to the upper frame 120, the lower frame 130, and the side supports 140 by using bolts and nuts. However, the coupling method is not limited thereto and the top, bottom, and side flanges 152, 153, and 154 may be respectively coupled to the upper frame 120, the lower frame 130, and the side supports 140 by using various methods such as a welding method.

The upper frame 120 may be disposed on the unit battery cells 110 stacked in the horizontal direction and may be coupled to the top flanges 152 corresponding to the upper surfaces of the end plates 150. In this case, the exhaust outlets 121 may be formed in the upper frame 120 at positions corresponding to the vent members 115 of the unit battery cells 110.

The upper frame 120 may have upper frame bent portions 122 bent from lengthwise edges of the upper frame 120. A sealing member 123 may be formed on inner surfaces of the upper frame bent portions 122. In this case, the sealing member 123 may be formed of an elastic material such as rubber. The upper frame 120 may be coupled to a cover 125 and the sealing member 123, which are separately formed, and may be fit in the upper frame 120, thereby forming a sealed gas discharge passage.

The cover 125 coupled to the upper frame 120 from above may discharge a gas in a sealed state or may serve as a gas discharge inducing passage in an incompletely sealed state. When gas is generated from the unit battery cells 110, explosion or a rapid chemical reaction equivalent to the explosion occurs, and thus an explosive amount of gas is generated within a short period of time. Thus, if a duct for discharging gas is formed in a battery pack, the gas may be easily discharged.

Sealing rings 117 may be disposed between the upper frame 120 and the vent members 115 such that a gas ejected from the vent members 115 flows outward through the exhaust outlets 121 of the upper frame 120 without influencing neighboring unit battery cells 110.

The sealing rings 117 may be, for example, O rings. In this case, grooves 152a in which the upper frame 120 is to be seated are formed at middles of the upper portions of the end plates 150. Accordingly, the exhaust outlets 121 of the upper frame 120 may closely contact the unit battery cells 110. The upper frame 120 may be coupled to the top flange 152 existing at the groove 152a of each of the end plates 150.

Also, the sealing rings 117 between the unit battery cells 110 and the upper frame 120 may each have a sufficient thickness. As such, when the upper frame 120 is coupled to the end plates 150, the upper frame 120 may apply pressure down on the unit battery cells 110 so as to compress the sealing rings 117 interposed therebetween and thus the upper frame 120 may closely contact the unit battery cells 110.

The lower frame 130 may be disposed under the unit battery cells 110 so as to support the weight of the unit battery cells 110 and may be connected to the bottom flanges 153 of the end plates 150. In order to support the weight of the unit battery cells 110, the lower frame 130 may include lower frame bent portions 132 bent away from the unit battery cells 110. The lower frame bent portions 132 may be bent downward.

The lower frame 130 may be coupled to the bottom flanges 153 of the end plates 150 with support protrusions 170. The support protrusions 170 may support the elastic frame 160 on the end plates 150 and/or the lower frame 130. The support protrusions 170 may be, e.g., bolts that are screw coupled to nuts.

A spacer 175 may be disposed on the support protrusions between the lower frame 130 and the elastic frame 160. The spacer 175 may maintain a constant gap between the lower frame 130 and the elastic frame 160 at the end part of the battery module 100.

The elastic force that the elastic frame 160 exerts on the battery cells 110 may be controlled by regulating the thickness of the spacer 175. In an implementation, the spacer 175 may have the form of washer and the support protrusions 170 may be inserted through the spacer 175 and coupled with the spacer 175.

The support protrusions 170 are not limited to the embodiment illustrated FIG. 2, but may be fixed to the end plates 150 and/or the lower frame 130, respectively. The support protrusions 170 may fix or support the elastic frame 160 to or on the end plates 150 and/or the lower frame 130. In this case, the support protrusions 170 may contact support openings, e.g., support grooves 163, formed in the elastic frame 160.

The side supports 140 may be disposed at sides of the unit battery cells 110 so as to support the unit battery cells 110 from side surfaces of the unit battery cells 110. The side supports 140 may extend by a uniform width from one of the end plates 150 to the other of the end plates 150. Accordingly, horizontal support units 140a of the side supports 140 may support the unit battery cells 110 stacked horizontally in the battery module 100 inward from the side surfaces of the unit battery cells 110.

One or more through holes 141 may be formed in each of the side supports 140 so as to reduce the load of the side supports 140. Also, the side supports 140 may include side support bent portions 142 bent away from the unit battery cells 110 and thus may increase the strength of the side supports 140 against bending.

The cover 125 covering the upper frame 120 from above may be further included in the battery module 100. Since the cover 125 may cover the upper frame 120 of the battery module 100, a gas discharge duct may be formed between the cover 125 and the upper frame 120.

The covering of the upper frame 120 of the battery module 100 to define the gas discharge duct may be performed in various other methods. For example, the upper frame 120 may be implemented into a pipe extending in the length direction of the upper frame 120 by being covered with the cover 125. In this case, the pipe may be made compact by setting its height to be lower than or level with extensions 152b.

The elastic frame 160 may include an elastic portion 161, support portions 162, and the support grooves 163. The elastic portion 161 may be bent when the elastic frame 160 is installed on the bottom of the lower frame 130, thereby generating elasticity.

The support portions 162 may be supported by the lower frame 130. The support grooves 163 may be formed on the support portions 162 and may contact the support protrusions of 170 of the lower frame 130 such that the support portions 162 are supported by the support protrusions 170.

Figure 4:
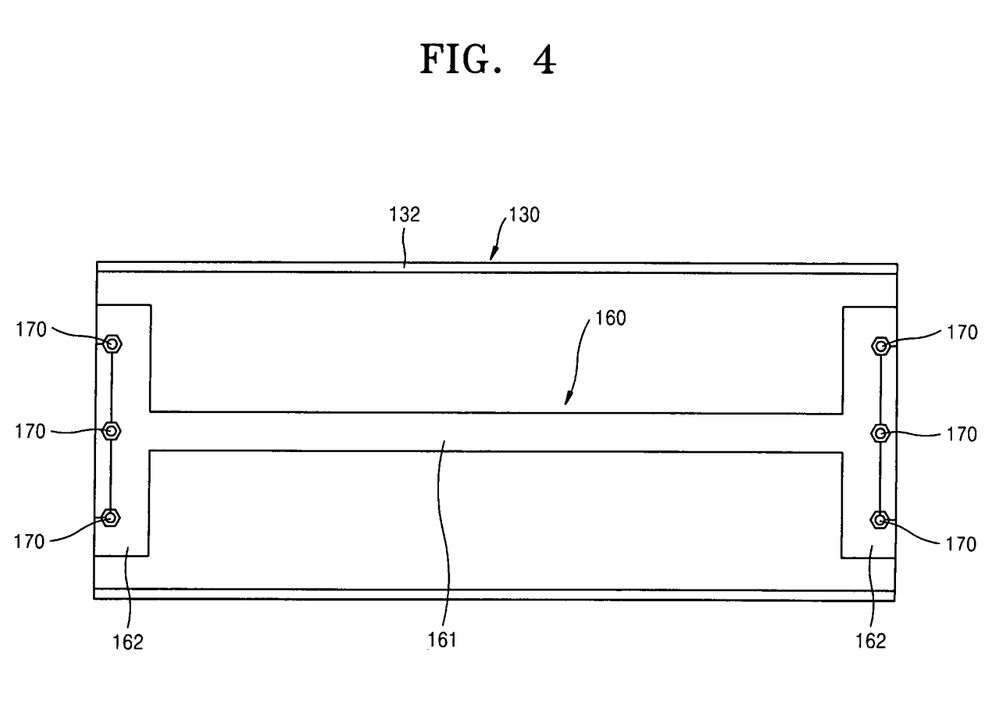
FIG. 4 illustrates a schematic view of an elastic frame installed below a lower frame in the battery module of FIG. 1.

FIG. 4 illustrates the elastic frame 160 installed below the lower frame 130 in the battery module 100 of FIG. 1.

Referring to FIG. 4, the elastic frame 160 may be installed below the lower frame 130. To this end, the support protrusions 170 may be included in the lower frame 130 and the elastic frame 160 may be fixed and/or supported to and/or by the support protrusions 170.

The support protrusions 170 may protrude from the lower surface of the lower frame 130 and may support the elastic frame 160 disposed therebelow so that at least a part thereof contacts a lower surface of the lower frame 130. The support protrusions 170 may be disposed on both ends of the lower frame 130 so that the elastic frame 160 is installed while being bent between the both ends of the lower frame 130. Accordingly, the elastic frame 160 may be elastically biased in the Z direction.

In the embodiment illustrated in FIG. 4, the support protrusions 170 may be bolts that couple the bottom flanges 153 of the end plates 150 to the lower frame 130. In this case, the support grooves 163 that smooth the contact with the support protrusions 170 may be formed on portions of the support portions 162 that contact the support protrusions 170. The support grooves 163 may prevent sliding from occurring on contact surfaces between the support portions 162 and the support protrusions 170.

The bottom flanges 153 of the end plates 150 may be coupled to the lower frame 130 by a plurality of bolts and nuts. In the present embodiment, the bottom flanges 153 of the end plates 150 may be coupled to the lower frame 130 by three bolts and nuts disposed at equal intervals. To this end, holes into which the bolts are to be inserted may be formed in portions of the bottom flanges 153 of the end plates 150 and in portions of the lower frame 130 so that the holes formed in the bottom flanges 153 face the holes formed in the lower frame 130.

The support protrusions 170 may penetrate through the lower frame 130 from the bottom flanges 153 of the end plates 150 so as to be exposed. The support grooves 163 may contact the support protrusions 170 so that the support portion 162 may be supported by the support protrusions 170.

Nuts may be coupled to portions of the support protrusions 170 that are exposed below the support portions 162 so that parts of the support portions 162 are fixed to the lower frame 130 and thus the elastic frame 160 may be stably supported by the lower frame 130.

Figure 6:
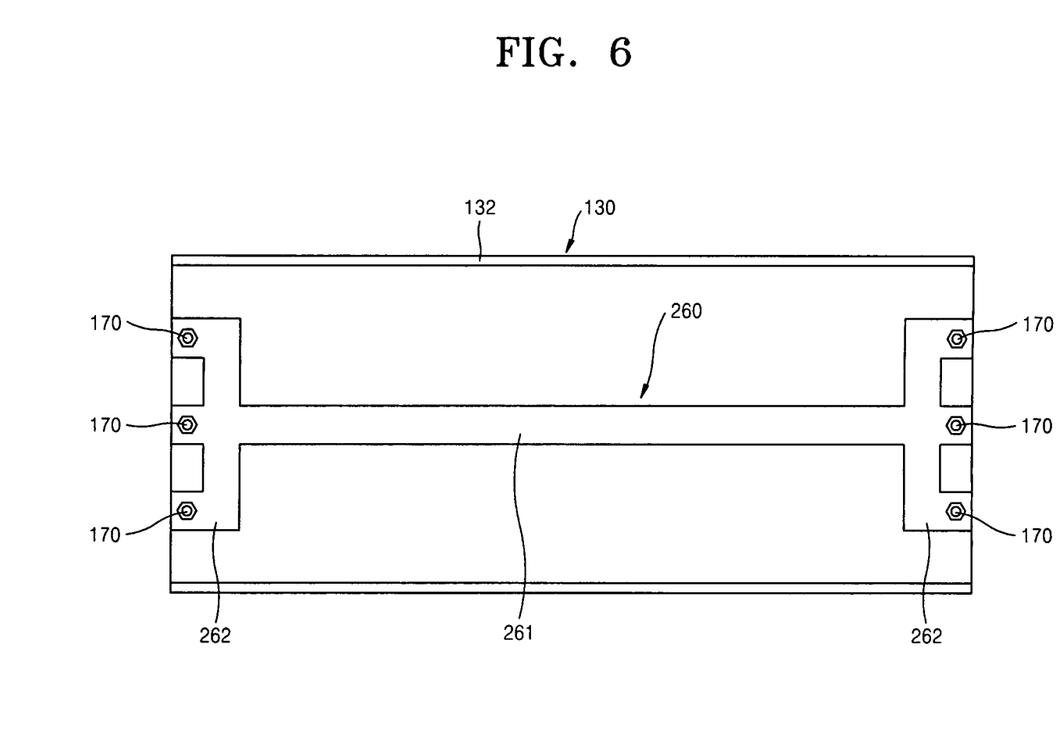
FIG. 6 illustrates a schematic view of an elastic frame installed in a battery module according to another embodiment.

However, the embodiments are not limited to the embodiment of FIG. 4. As illustrated in FIG. 6, an elastic frame 260 may include an elastic portion 261 and support portions 262. In addition, support openings, e.g., through holes (not illustrated), instead of the support grooves 163, may be formed in the support portions 262, and the support protrusions 170 may be inserted into the through holes. In this case, nuts may be coupled to portions of the support protrusions 170 that are exposed below the elastic frame 260 so that the elastic frame 260 may be more firmly supported by the lower frame 130.

As illustrated in FIG. 4, the elastic portion 161, which receives elasticity, i.e., which may be elastically biased in the Z direction, may be narrower than the support portions 162. Considering the vertical stacking of battery modules 100, the portions of the support protrusions 170 exposed below the lower frame 130 may be shorter than the widths of the lower frame bent portions 132.

Figure 5:
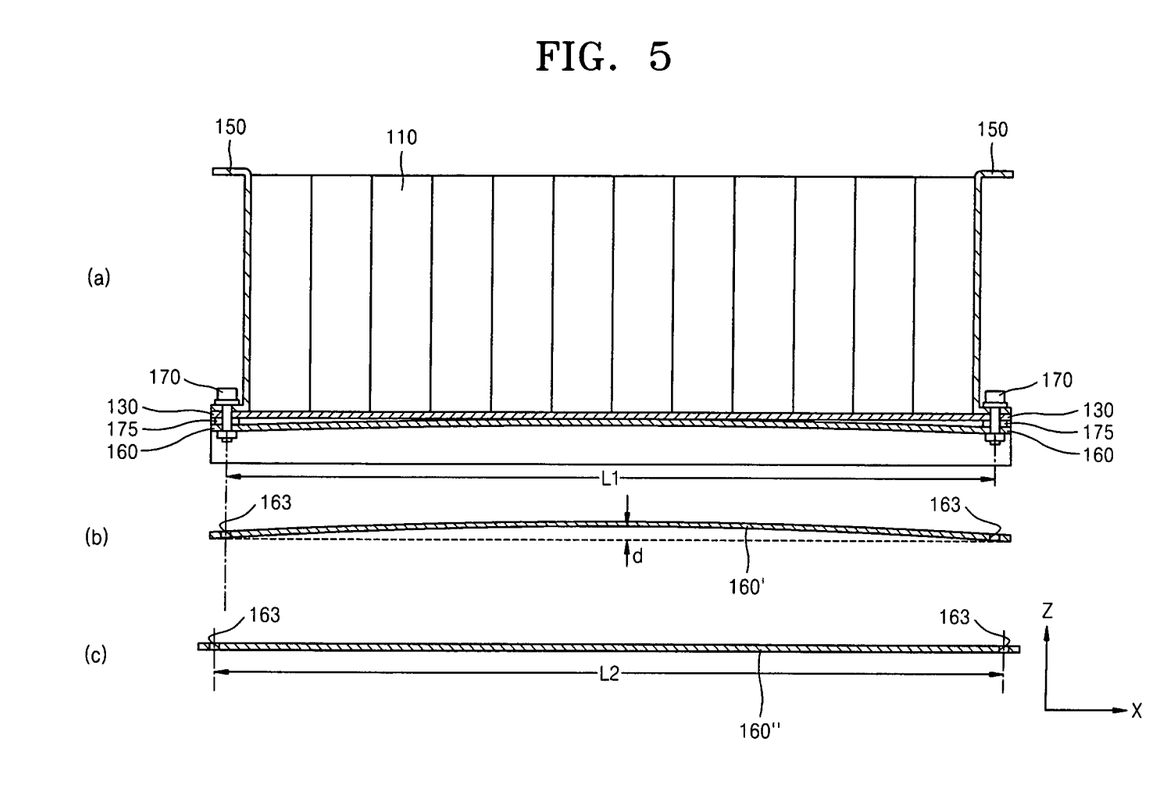

FIG. 5 illustrates a cross-sectional view of the elastic frame 160 installed below the lower frame 130 in the battery module 100 of FIG. 1. FIG. 5(c) illustrates an elastic frame 160" not yet assembled, FIG. 5(b) illustrates an elastic frame 160' assembled to a lower frame not yet having the battery cells 110 thereon, and FIG. 5(a) illustrates a cross-section of the battery module 100 having the battery cells 110 mounted on the lower frame 130 to which the elastic frame 160 has been coupled.

When the elastic frame 160 is coupled to the lower frame 130, a center of the elastic frame 160 may be bent and then the elastic frame 160 may be coupled to the lower frame 130. In other words, a distance between the support grooves 163 at one end of the elastic frame 160 and those at the other end thereof may be L2 prior to the coupling, whereas the distance may be L1 after the coupling. L2 may be larger than L1. The load that the elastic frame 160 is able to support may be controlled according to the distance L2.

As in FIG. 5(b), the elastic frame 160 may be coupled to the lower frame 130 so that the center of the elastic frame 160' is bent upward by a distance "d". Due to the bending of the elastic frame 160', an elastic force may be applied, i.e., the elastic frame 160' may be elastically biased, in the Z direction.

Figure 5A:
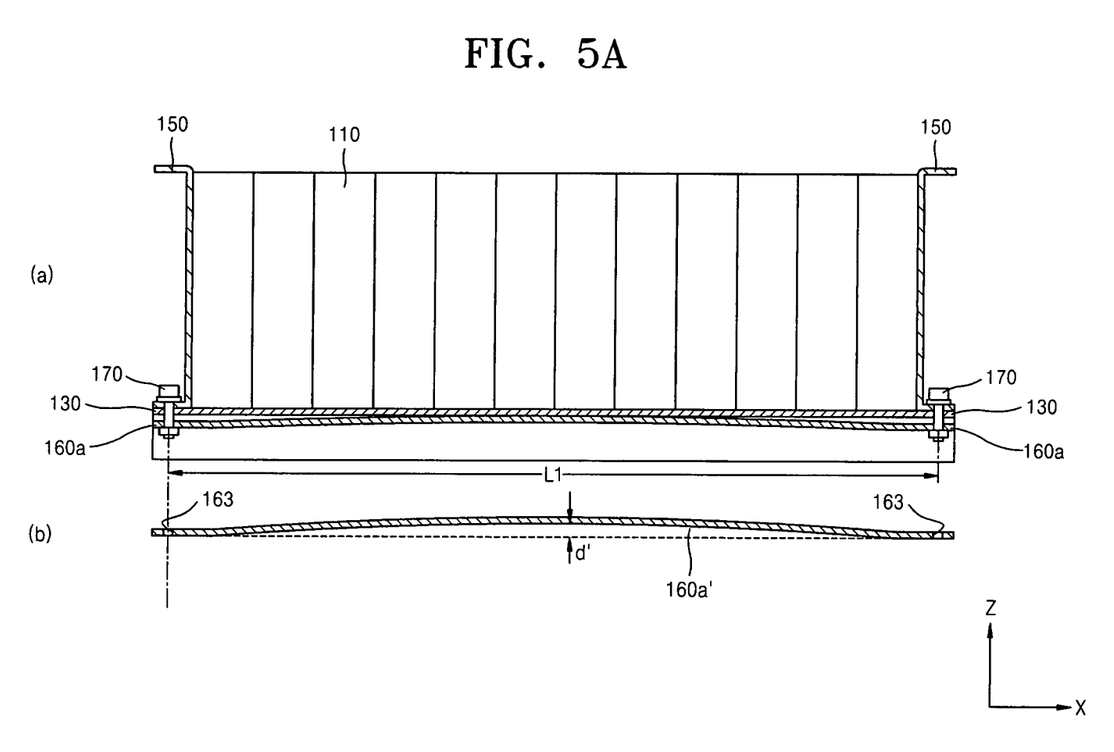
FIG. 5(a) illustrates a cross-section of a battery module having the battery cells mounted on a lower frame to which an elastic frame has been coupled.

As illustrated in FIG. 5(a), when the battery cells 110 are stacked on the lower frame 130, the load of the battery cells 110 may be applied to the elastic frame 160 in a −Z direction. Thus, the stacked battery cells 110 may receive elasticity in the Z direction when mounted on the lower frame 130.

As described above, the spacer 175 may be disposed on the support protrusions 170 between the lower frame 130 and the elastic frame 160. The spacer 175 may maintain a constant gap between the lower frame 130 and the elastic frame 160 at the end part of the battery module 100. The elastic force that the elastic frame 160 exerts on battery cells 110 may be controlled by regulating the thickness of the spacer 175.

Due to the Z-direction bending of a plate spring formed by the elastic frame 160, elasticity may be applied, i.e., the elastic frame 160 may be elastically biased, in the Z direction. Thus, sagging of the lower frame 130 due to the stacked battery cells 110 may be suppressed and a damper effect against impacts or vibrations may be achieved.

Accordingly, sagging and/or vibration of the battery module 100 due to static load and/or dynamic load may be suppressed, so that the battery cells 110 stacked in the battery module 100 may be stably supported.

FIG. 5A(b) illustrates an elastic frame 160a according to another embodiment not yet assembled. FIG. 5A(a) illustrates a cross-section of the battery module 100 having the battery cells 110 mounted on the lower frame 130 to which the elastic frame 160a has been coupled. In this case, the elastic frame 160a may be previously formed as a feature in FIG. 5A(a) before being assembled and the formed elastic frame 160a may be installed below the lower frame 130. In other words, the elastic frame 160 may have a bent configuration for effecting a spring bias prior to assembly of the battery module. In an implementation, the bent configuration may be an arc shaped configuration. Together, the lower frame and elastic frame may serve as a support frame having end regions in the vicinities of the support portions 162 and end plates 150 along with a middle region between the end regions. The middle region is located in the vicinity where the distance of displacement "d" is shown in FIG. 5A(b). The middle region may extend in the Z direction toward the unit battery cells 110 so as to be disposed upwardly and inwardly relative to the end regions.

Figure 7:
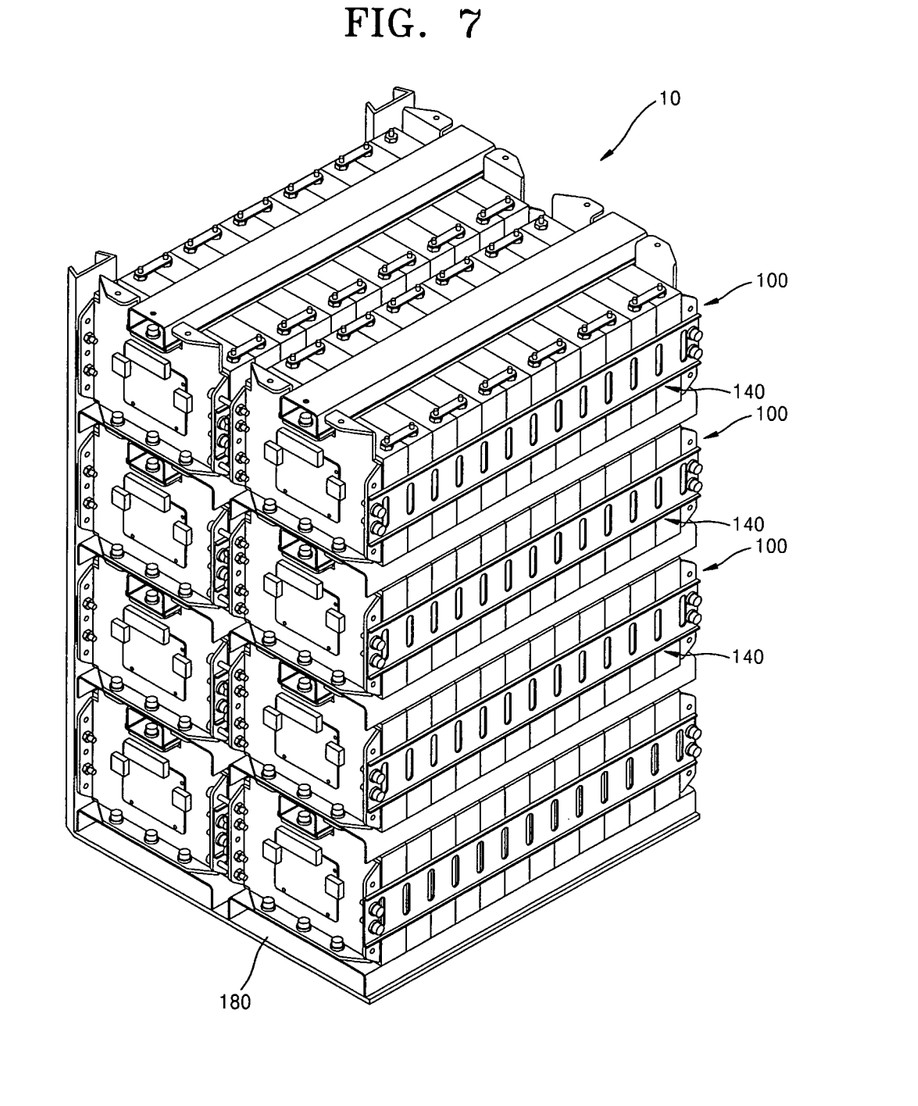
FIG. 7 illustrates a perspective view of a battery pack formed by stacking a plurality of the battery modules of FIG. 1 vertically and horizontally.

The battery pack 10 may be formed by stacking the battery modules 100 vertically and/or horizontally, and the stacked battery modules 100 may be installed on and fixed to a base frame 180. FIG. 7 illustrates a battery pack 10 formed by stacking a plurality of the battery modules 100 of FIG. 1 vertically and horizontally.

Figure 8:
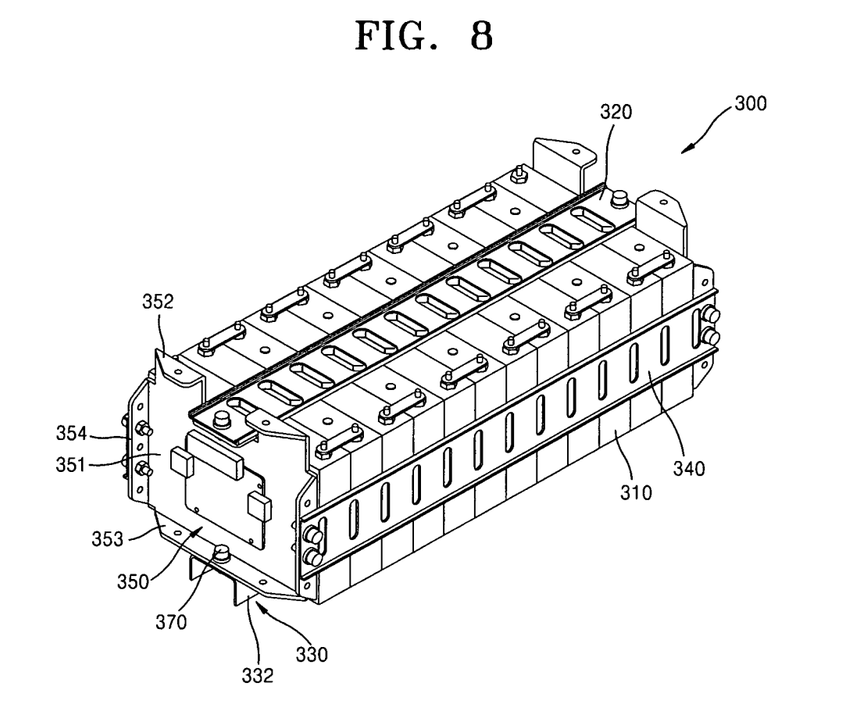
FIG. 8 illustrates a perspective view of a battery module according to another embodiment.
Figure 9:
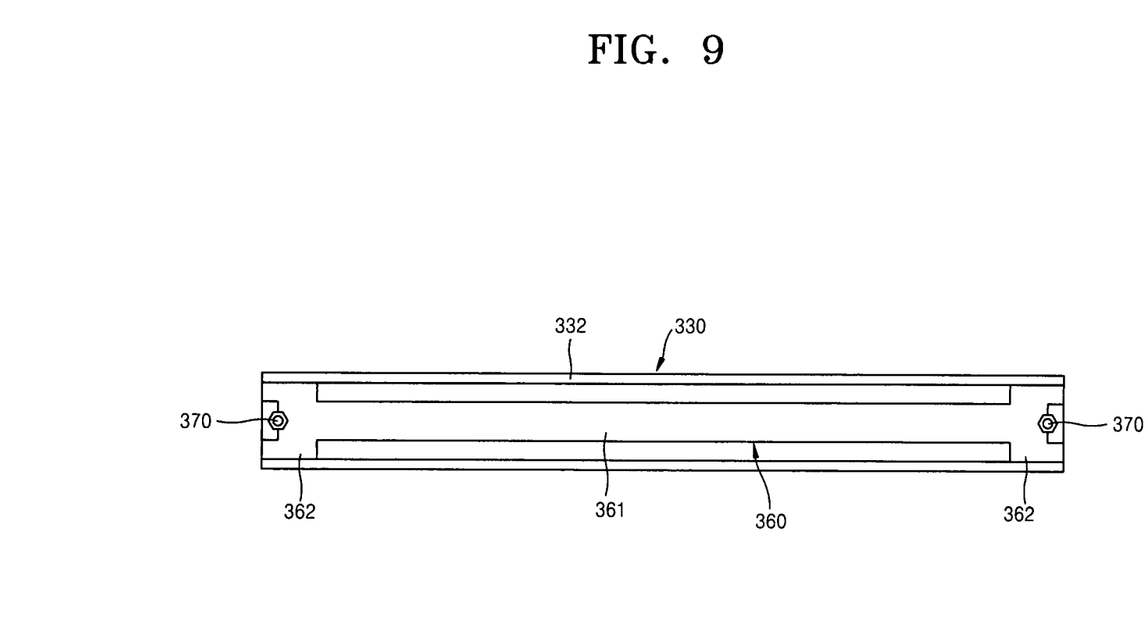
FIG. 9 illustrates a schematic view of an elastic frame installed below a lower frame in the battery module of FIG. 8.

FIG. 8 illustrates a perspective view of a battery module 300 according to another embodiment. FIG. 9 illustrates a schematic view of an elastic frame 360 installed below a lower frame 330 in the battery module 300 of FIG. 8.

Referring to FIG. 8, the battery module 300 according to the present embodiment is the same as the battery module 10 of FIGS. 1 through 5 except for the following descriptions. Like reference numbers are allocated to elements of the battery module 300 having the same function as in the battery module of FIG. 1, and a repeated detailed description thereof will be omitted.

Referring to FIGS. 8 and 9, the battery module 300 may include a plurality of unit battery cells 310, an upper frame 320, a lower frame 330, side supports 340, end plates 350, and an elastic frame 360. A battery pack may be formed by stacking a plurality of the battery modules 300 vertically and/or horizontally.

The unit battery cells 310 may be stacked in a first direction to form the battery module 300. The upper frame 320 may be disposed above the unit battery cells 310 stacked in the first direction so as to support the unit battery cells 310 in a second direction. The lower frame 330 may be disposed below the unit battery cells 310 stacked in the first direction so as to support the unit battery cells 310 from below.

The side supports 340 may be disposed on sides of the unit battery cells 310 stacked in the first direction so as to support the unit battery cells 310 from sides in a third direction. A pair of the end plates 350 may be disposed on both ends, respectively, of the unit battery cells 310 stacked in the first direction so as to support the unit battery cells 310 from the respective ends.

The elastic frame 360 may elastically support the stacked unit battery cells 310 in the Z direction. In other words, the elastic frame 360 may be installed on the end plates 350 and/or the lower frame 330 so as to be elastically biased in the Z direction.

In the battery module 300 according to the present embodiment, the lower frame 330 may be disposed under the unit battery cells 310 so as to support the weight of the unit battery cells 310 and may be connected to bottom flanges 353 of the end plates 350. In order to support the weight of the unit battery cells 310, the lower frame 330 may include lower frame bent portions 332 bent away from the unit battery cells 310.

The lower frame bent portions 332 may be bent downward. The lower frame bent portions 332 of one battery module 300 may be coupled to the upper frame 320 of a battery module 300 stacked therebelow, thereby forming a gas passage. In this case, the gas passage formed by combining the lower frame 330 of one battery module 300 and the upper frame 320 of a battery module 300 stacked therebelow may function as a degassing duct for discharging a generated gas.

The elastic frame 360 may include an elastic portion 361, support portions 362, and support grooves (not illustrated). The elastic portion 361 may be bent when the elastic frame 360 is installed on the bottom of the lower frame 330, thereby generating elasticity. The support portions 362 may be supported by the lower frame 330. The support grooves may be formed on ends of the support portions 362 and may contact support protrusions 370 of the lower frame 330 so that the support portions 362 are supported by the support protrusions 370.

A bottom flange 353 of each of the end plates 350 may be coupled to the lower frame 330 with one bolt and one nut. In addition, both lateral side ends of each of the support portions 362 may be supported by the lower frame bent portions 332. Accordingly, the elastic frame 360 may be efficiently supported by the lower frame 330.

Each of the end plates 350 may include a base plate 351 and flanges 352, 353, and 354 bent from the base plate 351 away from the unit battery cells 310.

The flanges 352, 353, and 354 may include top flanges 352, the bottom flange 353, and side flanges 354. The top flanges 352 may be coupled to the upper frame 320. The bottom flange 353 may be coupled to the lower frame 330. The side flanges 354 may be correspondingly coupled to the side supports 340.

The elastic frame 360 may be installed below the lower frame 330. To this end, the support protrusions 370 may be disposed in the lower frame 330, and the elastic frame 360 may be fixed and/or supported to and/or by the support protrusions 370.

The support protrusions 370 may protrude from the lower surface of the lower frame 330 and may support the elastic frame 360 disposed so that at least a part thereof contacts a lower surface of the lower frame 330. The support protrusions 370 may be formed on both ends, respectively, of the lower frame 330, so that the elastic frame 360 is installed while being bent between the both ends of the lower frame 330. Accordingly, the elastic frame 360 may be elastically biased in the Z direction.

In the embodiment illustrated in FIGS. 8 and 9, the support protrusions 370 may be bolts that couple the bottom flanges 353 of the end plates 350 to the lower frame 330. In this case, the support grooves that smooth the contact with the support protrusions 370 may be formed on portions of the support portions 362 that contact the support protrusions 370. The support grooves may prevent sliding from occurring on contact surfaces between the support portions 362 and the support protrusions 370.

As described above, the bottom flanges 353 of the end plates 350 may be coupled to the lower frame 330 by one bolt and one nut. To this end, holes into which the bolts are to be inserted may be formed in portions of the bottom flanges 353 of the end plates 350 and in portions of the lower frame 330 so that the holes formed in the bottom flanges 353 face the holes formed in the lower frame 330.

Nuts may be coupled to portions of the support protrusions 370 that are exposed below the support portions 362, so that parts of the support portions 362 are fixed to the lower frame 330 and thus the elastic frame 360 may be stably supported by the lower frame 330.

Figure 10:
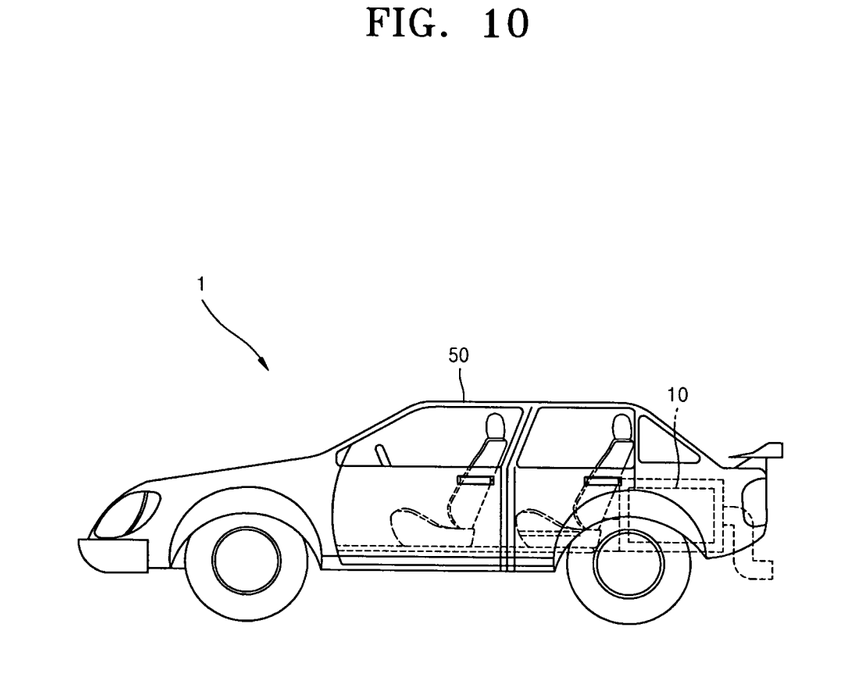
FIG. 10 illustrates an electric vehicle that employs a battery pack according to an embodiment.

FIG. 10 illustrates an image of an electric vehicle, e.g., car 1, which employs the battery pack 10, according to an embodiment.

The electric car 1 may include the battery pack 10 within a body 50 thereof. In this case, dynamic load may be transmitted to the battery pack 10 as the electric car 1 runs. Thus, the battery modules 10 stacked vertically and/or horizontally may sag and/or vibrate.

However, in the battery pack 10 according to an embodiment, the elastic frame 160 may elastically support a sagging portion of the battery module 100 so as to advantageously suppress the sagging and vibration of the battery module 100.

As described above, according to the one or more of the above embodiments, sagging of a battery module formed by stacking a plurality of unit battery cells may be suppressed.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
   a plurality of unit battery cells stacked in a first direction;
   a pair of end plates spaced from each other in the first direction and accommodating the unit battery cells therebetween, each of the end plates including a base plate and flanges bent from the base plate away from the unit battery cells;
   an upper frame coupled to upper surfaces of the pair of end plates;
   side supports coupled to side surfaces of the pair of end plates;
   an elastic frame below the unit battery cells, the elastic frame extending in the first direction and the elastic frame having the capability of being elastically biased in a second direction that is perpendicular to the first direction; and
   a lower frame below the battery cells, the lower frame being between the elastic frame and the unit battery cells, the lower frame including lower frame bent portions bent from the lower frame away from the unit battery cells;
   wherein:
      the elastic frame is coupled to the end plates with support protrusions including spacers thereon,
      the spacers have a form of a washer, and the support protrusions are inserted through the spacers such that the spacers maintain a constant space between the lower frame and the elastic frame, and
      an elastic force that the elastic frame exerts on the battery cells when the elastic frame is elastically biased in the second direction is changeable in response to a change in the thickness of the spacers.

2. The battery module as claimed in claim 1, wherein the elastic frame has a plate spring structure.

3. The battery module as claimed in claim 1, wherein the elastic frame is configured to be bent into a biased condition only after assembly of the battery module.

4. The battery module as claimed in claim 1, wherein the elastic frame has a bent configuration for effecting a spring bias prior to assembly of the battery module.

5. The battery module as claimed in claim 1, wherein the support protrusions are between the battery cells and ends of the elastic frame.

6. The battery module as claimed in claim 5, wherein the spacer is between the battery cells and ends of the elastic frame.

7. The battery module as claimed in claim 6, wherein the elastic frame has support openings, and the support protrusions are coupled to the support openings of the elastic frame.

8. The battery module as claimed in claim 7, wherein the support protrusions are fixed protrusions extending from one of the end plates or the lower frame.

9. The battery module as claimed in claim 8, wherein the elastic frame has an elastic portion and the elastic portion is narrower than the support portions.

10. The battery module as claimed in claim 8, wherein the elastic frame has an elastic portion and the elastic portion is wider than the support portions.

11. The battery module as claimed in claim 5, wherein the elastic frame includes:
   an elastic portion,
   support portions, and
   support openings on the support portions.

12. The battery module as claimed in claim 11, wherein the support openings are open ended support grooves.

13. The battery module as claimed in claim 11, wherein the support openings are support through holes.

14. The battery module as claimed in claim 11, wherein the support protrusions are disposed at ends of the lower frame, the support openings are disposed at ends of the elastic frame, and the support protrusions are coupled to the support openings.

15. A battery module, comprising:
   a plurality of unit battery cells stacked in a first direction;
   a pair of end plates spaced from each other in the first direction and accommodating the unit battery cells therebetween, each of the end plates including a base plate and flanges bent from the base plate away from the unit battery cells;
   an upper frame coupled to upper surfaces of the pair of end plates;
   side supports coupled to side surfaces of the pair of end plates;
   an elastic frame below the unit battery cells, the elastic frame extending in the first direction and having an arc shape that is arched toward the battery cells in a second direction that is perpendicular to the first direction; and
   a lower frame below the battery cells, the lower frame being between the elastic frame and the unit battery cells, the lower frame including lower frame bent portions bent from the lower frame away from the unit battery cells;
   wherein:
      the elastic frame is coupled to the end plates with support protrusions including spacers thereon,
      the spacers have a form of a washer, and the support protrusions are inserted through the spacers such that the spacers maintain a constant space between the lower frame and the elastic frame, and
      an elastic force that the elastic frame exerts on the battery cells is changeable in response to a change in the thickness of the spacers.

16. A battery module, comprising:
   a plurality of unit battery cells stacked in a first direction;
   a pair of end plates spaced from each other in the first direction and accommodating the unit battery cells therebetween, each of the end plates including a base plate and flanges bent from the base plate away from the unit battery cells;
   an upper frame coupled to upper surfaces of the pair of end plates;
   side supports coupled to side surfaces of the pair of end plates;
   an elastic frame below the unit battery cells for supporting the unit battery cells, the elastic frame extending in the first direction, the elastic frame also including end regions, each end region being adjacent to one of the end plates, and a middle region between the end regions, the middle region extending in a second direction that is perpendicular to the first direction and toward the unit battery cells so as to be disposed upwardly and inwardly relative to the end regions, and
   a lower frame below the battery cells, the lower frame being between the elastic frame and the unit battery cells, the lower frame including lower frame bent portions bent from the lower frame away from the unit battery cells;
   wherein:
      the elastic frame is coupled to the end plates with support protrusions including spacers thereon,
      the spacers have a form of a washer, and the support protrusions are inserted through the spacers such that the spacers maintain a constant space between the lower frame and the elastic frame, and
      an elastic force that the elastic frame exerts on the battery cells is changeable in response to a change in the thickness of the spacers.

* * * * *